(12) United States Patent
Wobben (10) Patent No.: US 7,296,974 B2
(45) Date of Patent: Nov. 20, 2007

(54) WIND ENERGY TURBINE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 118 days.

(21) Appl. No.: 10/504,545

(22) PCT Filed: Feb. 12, 2003

(86) PCT No.: PCT/EP03/01352

§ 371 (c)(1),
(2), (4) Date: May 3, 2005

(87) PCT Pub. No.: WO03/069156

PCT Pub. Date: Aug. 21, 2003

(65) Prior Publication Data

US 2005/0218656 A1    Oct. 6, 2005

(30) Foreign Application Priority Data

Feb. 14, 2002   (DE)   ................................. 102 05 988

(51) Int. Cl.
*F03D 9/00* (2006.01)
*H02P 9/04* (2006.01)

(52) U.S. Cl. .................... 416/132 B; 416/111; 416/142

(58) Field of Classification Search ................ 415/4.1, 415/4.3, 4.5, 905, 908; 416/132 B, DIG. 6, 416/111, 122, 9, 142, 244 A; 290/44, 55
See application file for complete search history.

(56) References Cited

U.S. PATENT DOCUMENTS

| | | | | |
|---|---|---|---|---|
| 4,311,434 A | * | 1/1982 | Abe | 416/142 |
| 4,340,822 A | * | 7/1982 | Gregg | 290/55 |
| 4,550,259 A | * | 10/1985 | Bertels | 290/55 |
| 5,876,181 A | * | 3/1999 | Shin | 415/2.1 |
| 6,505,785 B2 | * | 1/2003 | Willis et al. | 290/55 |
| 6,522,025 B2 | * | 2/2003 | Willis et al. | 290/55 |
| 6,614,125 B2 | * | 9/2003 | Willis et al. | 290/55 |

FOREIGN PATENT DOCUMENTS

| | | | |
|---|---|---|---|
| DE | 19741988 A1 | * | 4/1999 |
| DE | 698 00 698 T2 | | 8/2001 |
| EP | 1101936 A2 | * | 5/2001 |
| JP | 11082285 A | * | 3/1999 |
| WO | WO 96/10130 | | 4/1996 |
| WO | WO 98/32968 | | 7/1998 |
| WO | WO 01/34974 A1 | | 5/2001 |

* cited by examiner

*Primary Examiner*—Igor Kershteyn
(74) *Attorney, Agent, or Firm*—Seed IP Law Group PLLC (57) ABSTRACT

The invention relates to a wind turbine and to the installation of such a wind turbine, particularly offshore. When wind turbines are installed in the previously known manner, a tower of the wind turbine is firstly manufactured, said tower being a steel tower, a concrete tower or a lattice tower. After the tower has been erected, a machine house is mounted on the top of the tower and said machine house then consists of the entire nacelle, the generator, the rotor and other parts. Such a machine house with rotor blades attached thereto and a generator connected thereto is referred to in the following as a rotor unit. _The object of the present invention is to provide technical measures enabling the installation of offshore wind turbines in almost any weather, even when waves are small or moderate in height. _Wind turbine with a tower that receives a rotatably mounted support, wherein the support receives at least one and preferably a plurality of rotors that are in a plane offset from the tower, and the support is positioned such that the centre of the rotors is lower than the top of the tower.

13 Claims, 4 Drawing Sheets

WIND ENERGY TURBINE

BACKGROUND OF THE INVENTION

1. Field of the Invention

The invention relates to a wind turbine and to the installation of such a wind turbine, particularly offshore.

2. Description of the Related Art

When wind turbines are installed in the previously known manner, a tower of the wind turbine is firstly manufactured, said tower being a steel tower, a concrete tower or a lattice tower. After the tower has been erected, a machine house is mounted on the top of the tower and said machine house then includes the entire nacelle, the generator, the rotor and other parts. Such a machine house with rotor blades attached thereto and a generator connected thereto is referred to in the following as a rotor unit.

After the rotor unit has been anchored on the top of the tower and all cables required for power transmission have been laid, the wind turbine can basically start operation, whereby some initial adjustments still need to be made in order to ensure optimal turbine operation.

It has already been proposed—as is known, for example, from DE 44 13 688 or from Erich Hau, "Windturbines", 2nd edition, page 30, FIG. 2.6—that a wind turbine tower can receive not just one rotor unit but several rotor units. The tower of the wind turbine is provided in the form of a support construction to which different rotor units are attached.

BRIEF SUMMARY OF THE INVENTION

It is evident that such a wind turbine can be safely installed on land using construction cranes, but installing such wind turbines offshore is hardly possible because, given the very considerable heights of 60 m and more above sea level, weather conditions with virtually no waves are a fundamental requirement for installation to proceed. However, since such weather conditions are very rare in offshore areas, i.e., on the high seas, and are also very unreliable, an object of the present invention is to provide technical measures enabling the installation of offshore wind turbines in almost any weather, even when waves are small or moderate in height.

The invention achieves the aforesaid object with a constructional measure that has the features of claim 1. Advantageous developments are described in the subclaims.

In the wind turbine according to the invention, a support construction is rotatably mounted and disposed on the tower or at the top of the tower. Said support construction can now be rotated in the direction of the water until the distance between the end of the support and the ship on which the rotor unit of the wind turbine is located is as small as possible. This means that very tall cranes are no longer necessary.

If the wind turbine itself also has the hoisting gear for the rotor unit, and with which the wind turbine rotor unit located on the ship is hoisted, the entire rotor unit, i.e., the rotor with the attached blades, and if necessary with the machine house connected thereto, can be guided to the tip end of the support and anchored there. After that, the entire support can be pivoted into the desired position.

If the entire wind turbine has a support construction comprised of a plurality of support arms, the entire wind turbine can also receive a plurality of rotor units. Although this was known in principle from the aforementioned prior art, actually installing such a construction is now possible in a very advantageous manner.

It should not be forgotten that certain elements of a wind turbine have to be maintained and, in certain circumstances, replaced, particularly given the enormous loads that are exerted on offshore wind turbines. If ships' cranes always have to be used in such cases, such maintenance or replacement of elements or parts of the wind turbine may not be possible at all in certain circumstances, because the weather conditions required for safe and reliable use of such ships' cranes do not arise for weeks on end.

With the wind turbine according to the invention, in contrast, it is possible, even in rough weather, to perform maintenance work and, in certain circumstances, to replace elements of the wind turbine or entire rotor units if necessary, by lowering them onto or lifting them off the maintenance ship using the hoisting gear that the wind turbine possesses.

This is preferably done by moving the support arm on which the rotor unit is to be fitted into the six-o-clock position, such that there is as small a gap as possible between the ship (or platform, pontoon, etc.) and the tip end of the support.

If the support construction is configured as a three-armed, star-shaped support with equal angles (120°) between the support arms of the star, each support arm can be brought consecutively into the six-o-clock position and be fitted first of all with the respective rotor units.

If each rotor unit has a large power output, for example 1.5 MW to 10 MW per rotor unit, such a wind turbine is equivalent to a small or medium-sized power station. Although quite substantial measures must be taken for offshore installation of the tower, they need only be carried out once for a wind turbine according to the invention, even when the entire wind turbine carries two, three or more rotor units. This is much less costly than if a separate tower must be erected for each rotor unit.

If, during installation of the wind turbine, the support arms are mounted on rotary bearings, enormous torques and hence enormous loads will inevitably occur. Another problem arises when, after the first support arm has been mounted, for example, the rotary bearing must be turned to the position for fitting another support arm, in that the support arm already mounted produces restoring forces that must be safely absorbed by the structure.

In order to eliminate such loads resulting from the torques involved, weights can be fitted to the rotary bearing before mounting, said weights producing a torque equal to that of a support arm. In the case of a support with three support arms or weights offset by 120° to each other, the resultant torque is then zero.

Different weights are required for this, depending on the method used to build the wind turbine. Weights producing the same torque as the support arm and rotor unit must always be fitted to the rotary bearing. If the support arm and rotor unit are consecutively mounted without changing the position of the rotary bearing, these weights are insufficient for the installation procedure.

However, if all the support arms are firstly mounted in succession, e.g., because these are ready before the rotor units, weights are still required. These weights must produce a torque equal to that of the rotor unit and are fitted to the support arms. In this way, the rotor units can be mounted after the support arms have been mounted—likewise without a resultant torque being produced.

According to a preferred development of the invention, the abseiling and/or hoisting unit is comprised of at least one deflection roll, but preferably a pulley. Using such a pulley, and of course a cable running over it, it is possible to perform hoisting or abseiling even when the force needed to do so is provided, for offshore wind turbines for example, by a machine on board a ship. In order to compensate for waves, a mooring winch can preferentially be used. In this way, it is possible to provide at least one emergency hoisting or abseiling device that allows work to be carried out even when a drive in the wind turbine has failed. The drive for the hoisting and/or abseiling device can also be dispensed with in this way, in order to reduce the costs for the wind turbine.

Above all, however, the construction according to the invention provides for very inexpensive and maintenance-friendly installation, upkeep, and hence replacement of single parts of the wind turbine.

If it is necessary, for example, to service parts of a rotor unit, e.g., when blades must be replaced or reconditioned, the entire unit can be lowered onto the waiting ship after moving the respective rotor round to the six-o-clock position, serviced either on the ship or on land, after which the serviced rotor unit can be returned to its proper position, whereby those rotor units not affected by servicing work remain in operation, indeed at a very high level above the waterline, with the result that the remaining rotor units are exposed on the whole to stronger wind than usual.

The entire support is preferably in a single plane, rotatable and offset from the tower, and is also mounted so that it can be pivoted about the tower. Likewise, the separate rotor units can also receive a desired azimuth angle (the angle about the support unit). This means that all the rotor units can be brought to the desired position relative to the wind, so that optimal energy yields are achieved at all times.

The invention shall now be described in greater detail with reference to an embodiment shown in the drawings.

DETAILED DESCRIPTION OF THE INVENTION

Figure 1:
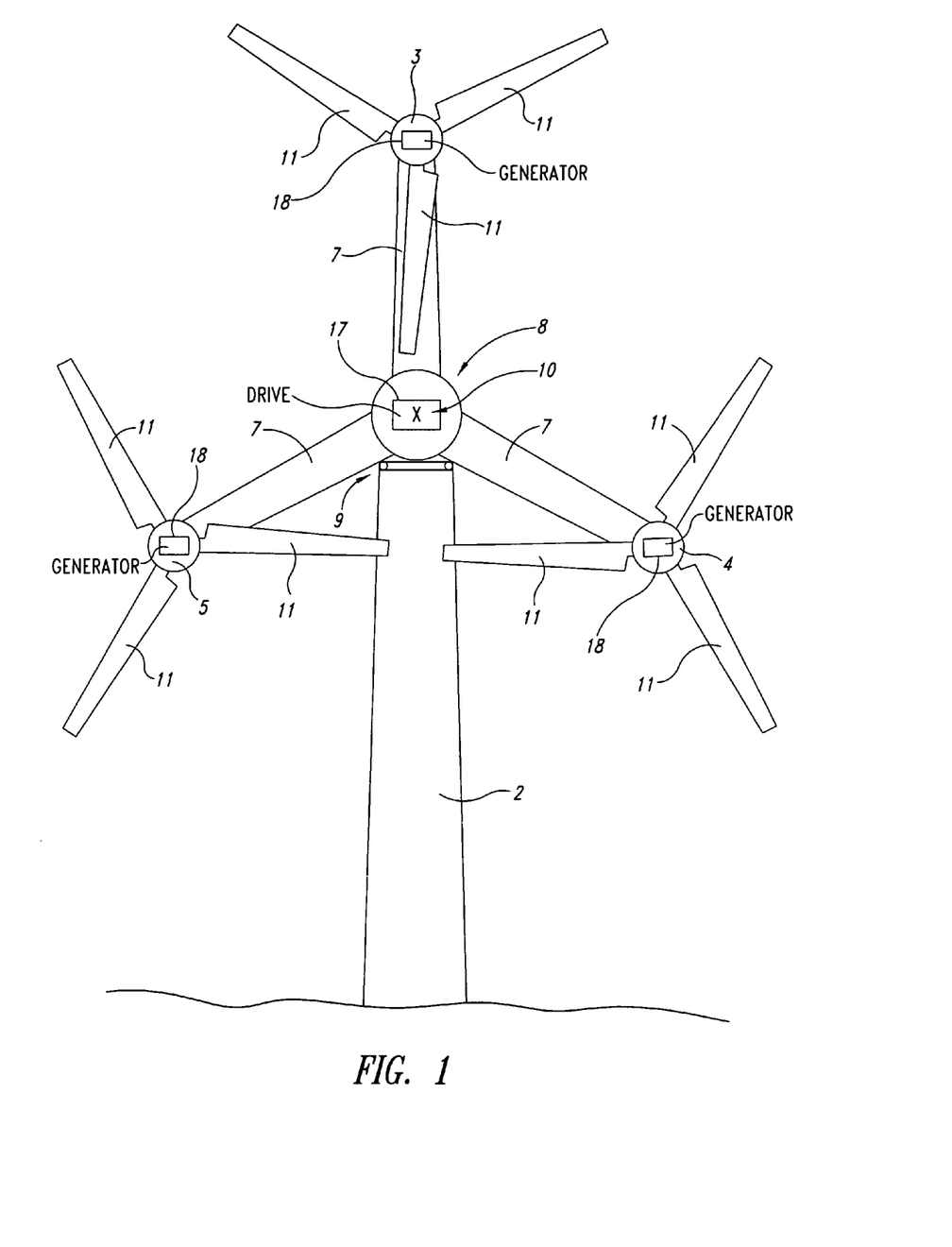
FIG. 1 is a front view of an offshore wind turbine according to the invention.

FIG. 1 shows a front view of an offshore wind turbine, according to one embodiment of the present invention, comprised of a tower 2 and three rotor units 3, 4, and 5. Each rotor unit has the same structure. The rotor units are received by a support that is formed, for its part, as a star-shaped support 7 and which is rotatably mounted on the top of the tower 2. The rotary bearing 8 of the support is also indicated, as is the yaw bearing 9 by means of which the entire support can be swivelled (turned) around the tower. FIG. 1 also shows the respective drives 17 for rotating the support about its central support axis 10 and for pivoting the support about the axis of the tower. Normal motor drives, for example electric motor drives designed for the relevant power rating, can be used for such drives.

Each rotor unit 3, 4 and 5 consists of a rotor with blades attached thereto, and preferably also a generator 18 that is attached to said rotor. The constructional design is already known from normal wind turbines such as the Enercon E-40 or E-66. In addition, each rotor unit also includes the usual devices for operating the entire rotor unit, and the blades 11 of a rotor preferably have variable pitch angles to the wind (pitch setting), for which purpose known pitch adjusters (not shown) are used.

The electrical power generated by each rotor unit is processed or outputted either through a converter system specifically assigned to each rotor, or through a central converter system (a converter system is comprised of a rectifier, an intermediate DC circuit and an inverter on the load side), for example to a transformer unit for raising the electrical power generated to a desired voltage level.

If a wind turbine such as that shown in FIG. 1 is now installed, using means hitherto known, the various parts of each rotor unit would have to be placed, using crane ships, onto the tip ends of the support arms, or the machine house disposed thereon.

Figure 2:
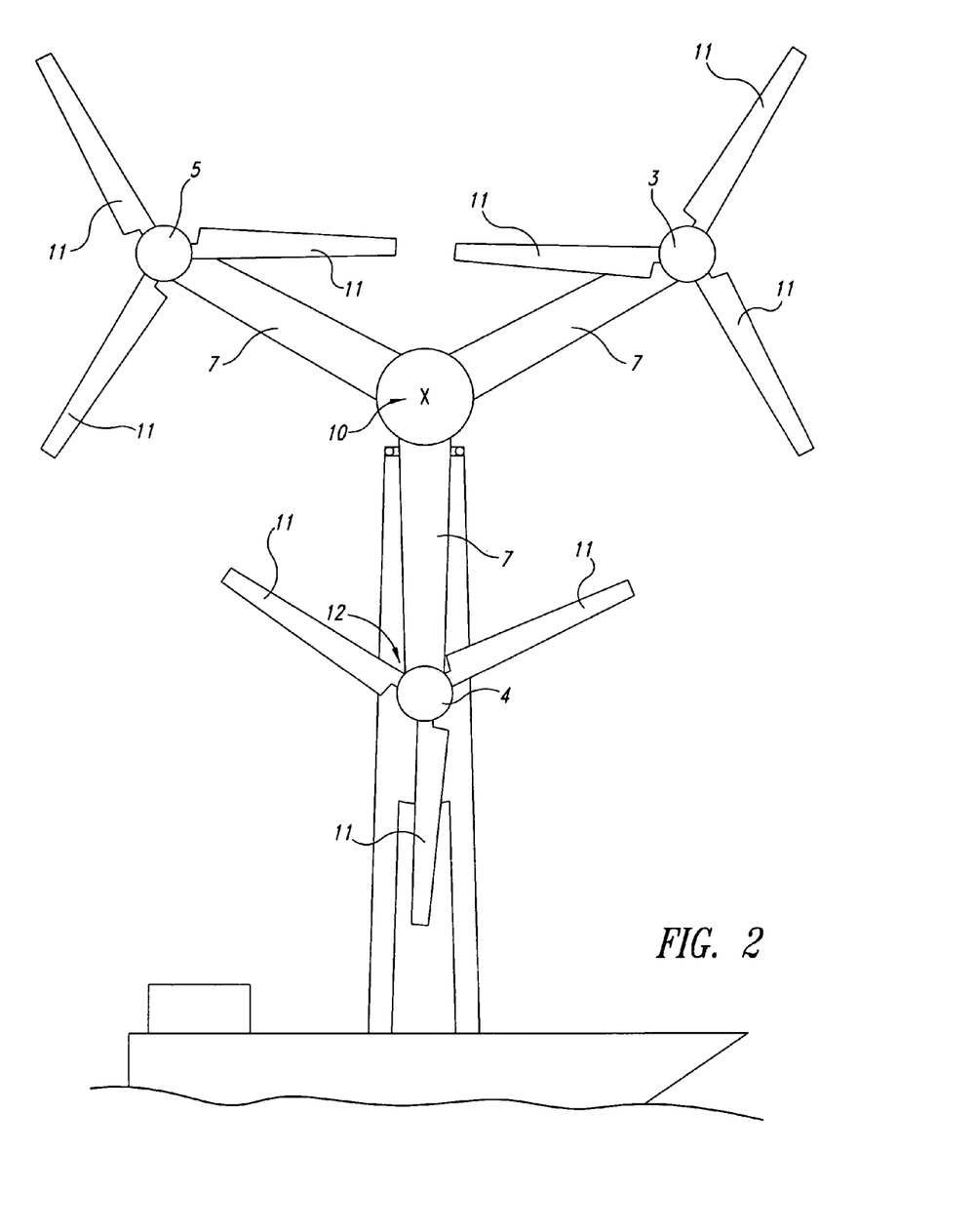
FIG. 2 is a front view of a wind turbine according to the invention in the position for fitting a rotor unit.

However, to install a wind turbine according to the invention, the entire support can be rotated about the central axis 10 of the support so that a support arm 7—as shown in FIG. 2—is brought to the six-o-clock position (i.e., pointing vertically downwards to the water surface). This gives rise to a smallest possible distance between the tip of support arm 7 and the ship carrying the rotor unit for installation on the wind turbine. In FIG. 2, the respective drives 17 and generators 18 are not present for clarity.

Figure 3:
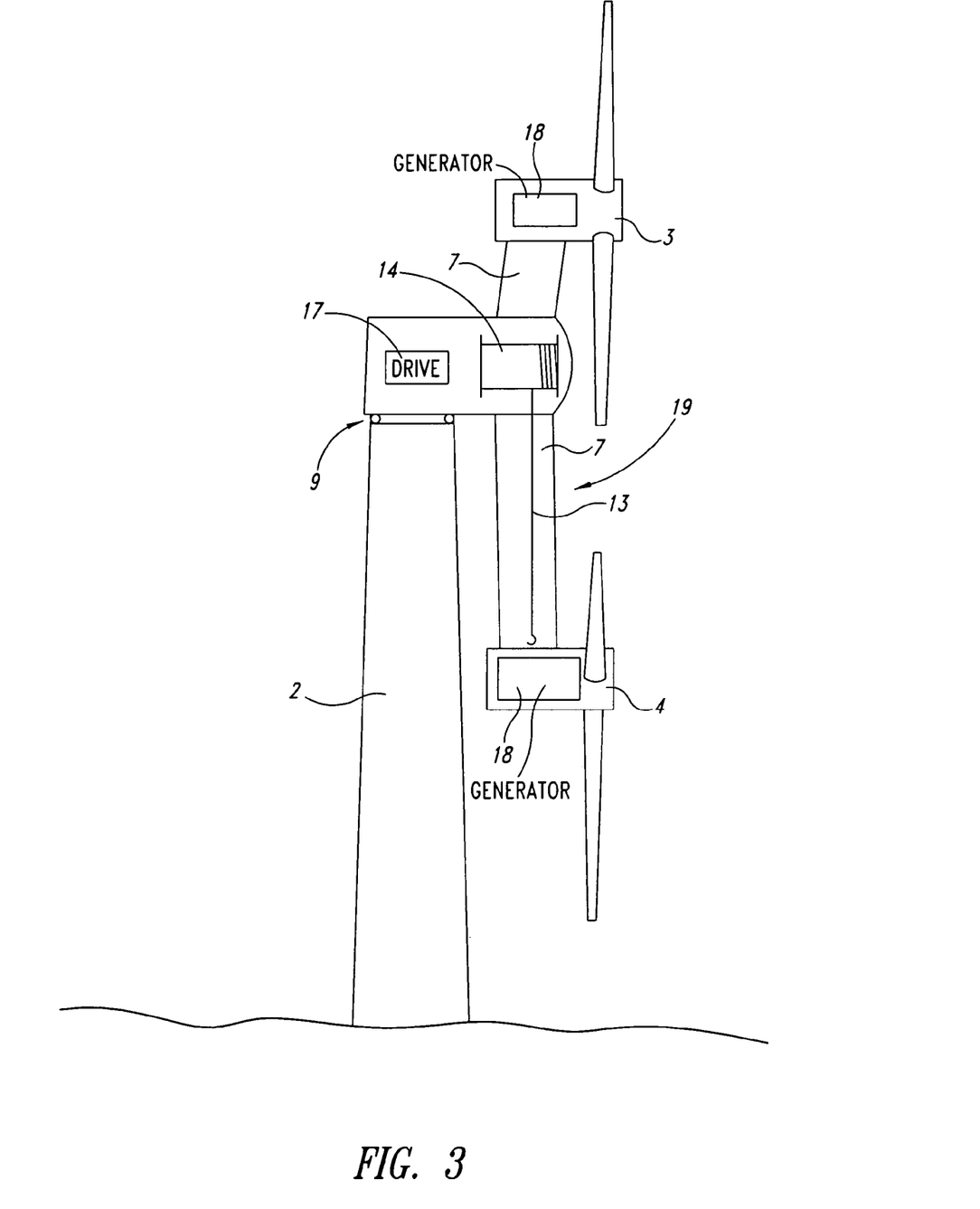
FIG. 3 shows the wind turbine of FIG. 2 in a side elevation view.

By using appropriate hoisting gear, the entire rotor unit can be guided during hoisting to the end of the support arm 12, whereby the hoisting gear is preferably provided in or on the wind turbine itself, thus obviating the need for a ship's crane. Said hoisting gear can consist, for example, of a suitably configured cable pull system 19, as illustrated in FIG. 3, with one or more cables 13 that are fed through the support arm 7, which for its part is hollow inside. The entire rotor unit, or the main parts thereof, can thus be hoisted from the ship or lowered onto the ship by means of the hoisting gear. When the rotor unit has been mounted on support arm 7, the latter can be turned (after installation of the first rotor unit) until the next support arm 7 is in the six-o-clock position, and so on until all the rotor units have been mounted on their support arm.

After that, the entire support construction can be rotated so that the separate rotor units 3, 4, 5 are all at a maximum height above sea level, as shown in FIG. 1.

FIG. 3 shows a side elevation view of the arrangement in FIG. 2, and it can be seen that the support with the three attached support arms 7 is in a plane laterally offset from the tower 2, and therefore can be pivoted about the tower by means of the yaw bearing 9. In FIG. 3, hoisting gear in the form of a cable pull system 19 can also be seen. A cable pulley block 14 is provided inside the support and the cable 13 running over it can itself be fed through the hollow support arms 7 in order to carry the rotor units 3, 4, 5 or the main parts thereof. It is self-evident that every support arm 7 can be fitted with its own cable, in principle, but it is preferable to have only one single cable system with a single cable 13 that, depending on how support arms 7 are positioned, can be lowered into the latter.

In the example shown, the separate rotor units 3, 4, 5 do not have any yaw bearing of their own on support arms 7, which means that the yaw adjustment for all the support arms 7 is done with the one yaw bearing 9. If necessary, however, each rotor unit can be given its own yaw bearing at the transition between the rotor unit 3, 4, 5 and its support arm 7 (like the yaw bearing between the machine house and the tower in known wind turbines).

Figure 4:
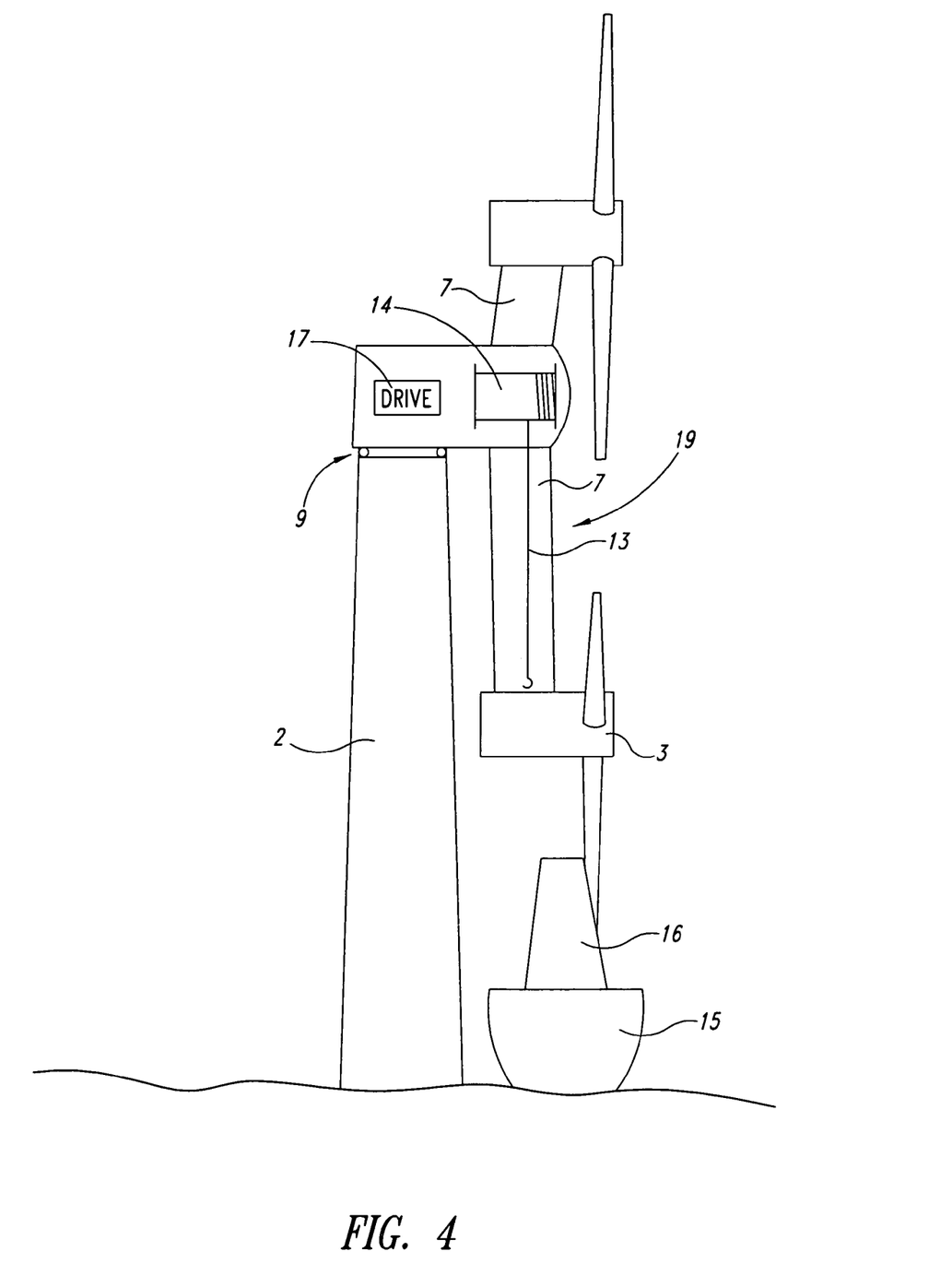
FIG. 4 shows the wind turbine of FIG. 3 during fitting of a rotor unit.

FIG. 4 shows a sketch of a wind turbine according to the invention being installed. A ship 15 with an auxiliary carrier 16 receives a rotor unit 3. After the hoisting gear has been attached to said rotor unit 3, the entire rotor unit 3 is pulled upwards (and pivoted about a desired angle, if necessary) and can then be fastened onto support arm 7. In FIG. 4, the respective generators 18 are not present for clarity.

If, due to maintenance-related or other reasons, it is necessary to overhaul an entire rotor unit or significant parts thereof, the entire rotor unit 3 or significant parts of it can be lowered by the hoisting gear onto the maintenance ship 15 on which the actual maintenance work is carried out, or which then transports back to land the element that needs overhauling.

If a rotor unit 3 has to be removed during maintenance, the two other rotor units—which are then in the ten- and two-o-clock positions—can continue operating, with the result that maximum possible current and power yield is still ensured.

The invention can be deployed particularly advantageously in the case of wind turbines with large power outputs, i.e., using wind turbines having a total power output of between 8 and 30 MW, for example.

If each separate rotor unit has a power output of 4 MW to 5 MW, for example, the wind turbine according to the invention can be commissioned with a total power output of 12 MW to 15 MW.

When such a wind turbine is in operation, it is important to ensure that the minimum spacing between the separate rotor blade tips (when the respective rotor blade is in the six-o-clock position) is no less than a certain minimum height above sea level (e.g., 50 m). This prevents any collisions involving normal shipping traffic.

Due to its size, the wind turbine described above also has the advantage that it can also include the rooms needed for maintenance and service personnel better than in the wind turbines and towers common until now. The fact is easily overlooked that offshore wind turbines are not only operated, but also have to be managed and serviced by suitable personnel. Such personnel must be provided an appropriate social environment, such as rooms (shared rooms, kitchen, bedrooms, workshop, etc.). Such facilities are much easier to provide in very large towers than in relatively small towers with relatively small diameters.

The costs for a single tower—even if it is very large—are also much lower than the costs for installing three towers, particularly since each separate tower must have its own foundation, and only rarely can the same offshore tower (same depth, etc.) be used for different wind turbines in an offshore wind farm.

In order to increase the stability of the support, it can also make sense to connect the support arms to each other with tensioners.

Based on the foregoing benefits of the present invention, it can be appreciated that the present invention is not limited to offshore applications. The present invention would also be highly desirable for wind turbines that are situated in locations where environmental conditions or remoteness from an industrial area, make it difficult to install and maintain the wind turbine components. For example, a wind turbine that is installed in a remote area, the location of which imposes a heavy burden for transporting cranes and the land surface of which is not suitable for erecting temporary cranes, will be feasible to install and to maintain using an apparatus and a method according to an embodiment of the present invention. In such applications, a vehicle or apparatus that can be more conveniently transported to the wind turbine site and that can stow the rotors may be used in lieu of the ship in the offshore applications described above.

From the foregoing it will be appreciated that, although specific embodiments of the invention have been described herein for purposes of illustration, various modifications may be made without deviating from the spirit and scope of the invention.

The invention claimed is:

1. A wind turbine with a tower comprising:
   a rotatably mounted support coupled to the tower, the rotatable support having a plurality of support arms;
   a plurality of rotor units coupled to the tower, each of the rotors including a generator and a plurality of rotor blades, the rotor units each being in a plane offset from the tower;
   means for rotating the support such that each rotor unit can be positioned at a lowest possible point while attaching the respective rotor units to the support; and
   a rotor transport device, within the support by means of which each rotor unit is transported to the support in order to attach the rotor unit to the support.

2. The wind turbine according to claim 1, characterized in that the support is star-shaped and has three support arms disposed on a rotary bearing and spaced apart at equal angles of 120° to each other.

3. The wind turbine according to claim 1, characterized in that the transport device includes a cable pull system and that each support arm is hollow inside and that when lowering the rotor unit or when raising the rotor unit the cable runs inside the support arm to bring the rotor unit onto the support arm.

4. The wind turbine according to claim 2, characterized by support arms comprised of at least two sections.

5. The wind turbine according to claim 2, characterized in that each support arm and each support arm section has attachment devices for the transport device.

6. The wind turbine according to claim 2, characterized in that each support arm is about 50 m to 80 m in length and that the diameter of a rotor is about 100 m to 140 m.

7. The wind turbine according to claim 1, characterized in that the rotor unit is comprised of a rotor with blades attached thereto, the rotor being coupled to a machine house that has at least one generator connected to the rotor and driven by rotation of the rotor.

8. The wind turbine according to claim 1, characterized in that a drive is provided for rotating the support.

9. A method for installing a wind turbine characterized by the following steps:
   fitting a detachable weight to a flange of a rotary bearing;
   attaching the rotary bearing to the top of a tower;
   positioning the rotary bearing in a predetermined position;
   replacing the weight disposed on the flange of the rotary bearing with a support arm and a rotor unit by dismounting the weight and subsequently fitting the support arm and then fitting the rotor unit.

10. A method for installing a wind turbine characterized by the following steps:
   fitting a first detachable weight to a flange of the rotary bearing;
   fitting a second detachable weight to a flange of the support arm;
   attaching the rotary bearing to the top of the tower;
   positioning the rotary bearing in a predetermined position;
   replacing the first weight disposed on the flange of the rotary bearing with a support arm by dismounting the first weight and subsequently fitting the support arm.
   positioning the rotary bearing with the support arm in a predetermined position;
   replacing the second weight disposed on the flange of the support arm with a rotor unit by dismounting the weight and subsequently fitting the rotor unit.

11. A method for installing a wind turbine characterized in that:

during installation a support arm is first moved into approximately a six-o-clock position and the rotor unit is then guided around the end of the support arm and anchored there, and the support arm is subsequently pivoted into its specified operating position.

12. The wind turbine according to claim 1 wherein the rotor transportation device is a hoisting device.

13. The wind turbine according to claim 1 wherein the rotor transportation device is an abseiling device.

\* \* \* \* \*

UNITED STATES PATENT AND TRADEMARK OFFICE
CERTIFICATE OF CORRECTION

PATENT NO.       : 7,296,974 B2                                    Page 1 of 1
APPLICATION NO.  : 10/504545
DATED            : November 20, 2007
INVENTOR(S)      : Aloys Wobben It is certified that error appears in the above-identified patent and that said Letters Patent is hereby corrected as shown below:

Title Page Section (54)
"WIND ENERGY TURBINE" should read as -- WIND ENERGY TURBINE WITH ROTATABLE SUPPORT --

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

PATENT NO.        : 7,296,974 B2                                          Page 1 of 1
APPLICATION NO. : 10/504545
DATED             : November 20, 2007
INVENTOR(S)       : Aloys Wobben

It is certified that error appears in the above-identified patent and that said Letters Patent is hereby corrected as shown below:

<u>Title Page Section (54) and Column 1, line 1</u>
"WIND ENERGY TURBINE" should read as -- WIND ENERGY TURBINE WITH ROTATABLE SUPPORT --

This certificate supersedes the Certificate of Correction issued November 25, 2008.

Signed and Sealed this

Twenty-third Day of December, 2008

JON W. DUDAS
*Director of the United States Patent and Trademark Office*